(12) United States Patent
He et al.

(10) Patent No.: US 9,430,315 B2
(45) Date of Patent: Aug. 30, 2016

(54) METHOD AND SYSTEM FOR CONSTRUCTING COMPONENT FAULT TREE BASED ON PHYSICS OF FAILURE

(71) Applicant: Fifth Electronics Research Institute Of Ministry Of Industry And Information Technology, Guangzhou (CN)

(72) Inventors: Xiaoqi He, Guangzhou (CN); Yuan Chen, Guangzhou (CN); Yunfei En, Guangzhou (CN); Fangfang Song, Guangzhou (CN); Jingdong Feng, Guangzhou (CN); Yunhui Wang, Guangzhou (CN)

(73) Assignee: Fifth Electronics Research Institute of Ministry of Industry and Information Technology, Guangdong (CN)

( * ) Notice: Subject to any disclaimer, the term of this patent is extended or adjusted under 35 U.S.C. 154(b) by 0 days.

(21) Appl. No.: 14/351,862

(22) PCT Filed: Oct. 29, 2013

(86) PCT No.: PCT/CN2013/086158
§ 371 (c)(1),
(2) Date: Apr. 14, 2014

(87) PCT Pub. No.: WO2014/090048
PCT Pub. Date: Jun. 19, 2014

(65) Prior Publication Data
US 2015/0193290 A1  Jul. 9, 2015

(30) Foreign Application Priority Data
Dec. 11, 2012 (CN) .......................... 2012 1 0533794

(51) Int. Cl.
*G06F 11/00* (2006.01)
*G06F 11/07* (2006.01)
*G05B 23/02* (2006.01)

(52) U.S. Cl.
CPC ......... *G06F 11/079* (2013.01); *G05B 23/0248* (2013.01); *G05B 23/0278* (2013.01)

(58) Field of Classification Search
CPC ............. G06F 11/079; G06F 11/0709; G06F 11/2257
USPC ..................................................... 714/26, 37
See application file for complete search history.

(56) References Cited

U.S. PATENT DOCUMENTS 5,586,252 A * 12/1996 Barnard ................. G06Q 10/10
714/48
6,374,196 B1 * 4/2002 Hashimoto ......... H04L 41/0677
455/446

(Continued)

FOREIGN PATENT DOCUMENTS

CN  101846992 B  12/2011
CN  103049346 A  4/2013

OTHER PUBLICATIONS

English Translation of International Preliminary Report on Patentability Chapter I, Jun. 16, 2015.*

(Continued)

*Primary Examiner* — Elmira Mehrmanesh
(74) *Attorney, Agent, or Firm* — Nixon Peabody LLP

(57) ABSTRACT

A method and system for constructing component fault tree based on physics of failure are disclosed. The method includes the steps of: establishing, based on common characteristics of component physics of failure and according to six layers based on physics of failure and category of the component, a fault information database containing information of the six layers based on physics of failure; constructing, based on the fault information database and according to the six layers based on physics of failure and logical relationship of physics of failure, a component fault tree of n levels of events of six layers based on physics of failure; and simplifying the fault tree by means of failure mechanism sub-tree transferring and fault module sub-tree importing. The method and system are applicable to construction of fault tree of various components.

6 Claims, 1 Drawing Sheet

(56) References Cited

U.S. PATENT DOCUMENTS

| | | | |
|---|---|---|---|
| 6,499,132 B1* | 12/2002 | Morley | G06F 17/504 714/38.13 |
| 6,952,658 B2* | 10/2005 | Greulich | G06F 11/2257 702/183 |
| 7,120,559 B1 | 10/2006 | Williams et al. | |
| 7,379,846 B1* | 5/2008 | Williams | G06F 11/079 702/183 |
| 7,500,143 B2* | 3/2009 | Buia | H04L 12/66 714/26 |
| 7,856,575 B2* | 12/2010 | Bock | G06F 11/079 714/26 |
| 8,386,848 B2* | 2/2013 | Grell | G05B 23/0278 714/25 |
| 8,813,025 B1* | 8/2014 | Hammet | G06F 9/44 717/104 |
| 2009/0210183 A1* | 8/2009 | Rajski | G01R 31/01 702/84 |
| 2012/0290870 A1* | 11/2012 | Shah | G06F 21/10 714/4.11 |
| 2012/0317058 A1* | 12/2012 | Abhulimen | G06N 99/005 706/2 |

OTHER PUBLICATIONS

Wang et al., "Study on HgCdTe Detector Assemble Fault Tree and Failure Analysis", Semiconductor optoelectronics, Oct. 2012, vol. 33, No. 5, pp. 627-631, (Abstract in English).

International Search Report issued in PCT/CN2013/086158 dated Jan. 23, 2014, with English translation, 5 pages.

Yang, et al., "Fault Tree Logical Reduction Strategy for Living Probabilistic Safety Assessment," Atomic Energy Science and Technology, vol. 39, No. 5, Sep. 2005, pp. 433-437.

* cited by examiner

METHOD AND SYSTEM FOR CONSTRUCTING COMPONENT FAULT TREE BASED ON PHYSICS OF FAILURE

CROSS-REFERENCE TO RELATED PATENT APPLICATION

The present application is a National Stage Application of International Application No. PCT/CN2013/086158 entitled "Method And System For Constructing Component Fault Tree Based On Physics Of Failure" filed Oct. 29, 2013, which claims priority to Chinese Patent Application No. CN 201210533794.9, filed Dec. 11, 2012, the contents of which are incorporated herein by reference in their entirety.

FIELD OF THE INVENTION

The present disclosure relates generally to the field of reliability analysis of electromechanical system, and more particularly to a method and system for constructing component fault tree based on physics of failure.

BACKGROUND OF THE INVENTION

Fault Tree Analysis (FTA), a logical reasoning method for analyzing system reliability and safety raised by H. A. Watson and D. F. Haasl in Bell Laboratories of the United States in the early 1960s, is recognized as one of the simplest, most effective and most promising means for analyzing, forecasting and designing the reliability of complex systems.

It is difficult for a fault tree constructed by a general method to deep into the physics of failure on a component to conduct analysis. While the failure of component includes degenerative failure and transient failure, the information is very important to the reliability design and quality problem loop analysis. The fault tree constructed by a know method cannot go deep into the events of physics of failure of a component, and thus it is difficult to describe the failure mechanism and failure path.

SUMMARY OF THE INVENTION

To address the aforementioned deficiencies and inadequacies, there is a need to provide a method and system for constructing component fault tree based on the physics of failure, by which the fault tree constructed can go deep into the events of physics of failure.

A method for constructing component fault tree based on the physics of failure includes the steps of:

establishing, based on common characteristics of component physics of failure and according to six physics of failure layers and category of the component, a fault information database containing the information of the six physics of failure layers;

constructing, based on the fault information database and according to the six physics of failure layers and logical relationship of physics of failure, a component fault tree of n levels of events of six physics of failure layers, wherein n is greater than or equal to 6; and simplifying the fault tree by means of failure mechanism sub-tree transferring and fault module sub-tree importing.

In one embodiment, the step of establishing fault information database further includes:

determining, based on the common physical characteristics of component physics of failure, six information layers based on physics of failure, namely: information layer of fault mode, information layer of failure mode, information layer of failure site, information layer of failure mechanism, information layer of mechanism factor, and information layer of influencing factor; and classifying and organizing failure cases and failure information, and establishing, according to the six layers based on physics of failure, fault information database of the six layers based on physics of failure.

In one embodiment, the step of constructing component fault tree further includes:

determining, based on the fault information database, six layers of events of the fault tree, namely: fault mode, failure mode, failure site, failure mechanism, mechanism factor, and influencing factor;

determining, according to the causality of the process of physics of failure, logic gates between events in the component fault tree, and constructing a component fault tree of n levels of events of six layers based on physics of failure.

In one embodiment, the step of simplifying the fault tree further includes:

establishing component common cause failure mechanism sub-tree set and common cause failure module sub-tree set; the sub-tree set of component common cause failure mechanism and the sub-tree set of common cause failure module represent, respectively, a sub-tree set of failure mechanism under the influence of same event and a sub-tree set of failure module under the influence of same event; and simplifying the component fault tree by transferring common cause mechanism sub-tree and importing common cause failure module sub-tree into the component fault tree.

A system for constructing component fault tree based on physics of failure includes a fault information database establishing module, a fault tree constructing module, and a fault tree simplifying module.

The fault information database establishing module is configured to establish, based on common characteristics of component physics of failure and according to six layers based on physics of failure and category of the component, a component fault information database containing information of six layers based on physics of failure.

The fault tree constructing module is configured to construct, based on the fault information database and according to the six layers based on physics of failure and logical relationship of physics of failure, a component fault tree of n levels of events of six layers based on physics of failure.

The fault tree simplifying module is configured to simplify the fault tree by means of common cause failure mechanism sub-tree transferring and common cause fault module sub-tree importing.

In one embodiment, the fault information database establishing module is further configured to determine, based on the common physical characteristics of component physics of failure, six information layers based on physics of failure, namely: information layer of fault mode, information layer of failure mode, information layer of failure site, information layer of failure mechanism, information layer of mechanism factor, and information layer of influencing factor; and to classify and organize failure cases and failure information to establish, according to six layers based on physics of failure, fault information database of the six layers based on physics of failure.

In one embodiment, the fault tree constructing module is further configured to determine, based on the fault information database, six layers of events of the fault tree, namely: fault mode, failure mode, failure site, failure mechanism, mechanism factor, and influencing factor; and to determine, according to the causality of the process of physics of failure, logic gates between events in the component fault tree, and to construct component fault tree of n levels of events of six layers based on physics of failure.

In one embodiment, the fault tree simplifying module is further configured to establish component common cause failure mechanism sub-tree set and common cause failure module sub-tree set; the sub-tree set of component common cause failure mechanism and the sub-tree set of common cause failure module represent, respectively, a sub-tree set of failure mechanism under the influence of same event and a sub-tree set of failure module under the influence of same event; and to simplify the fault tree by transferring common cause mechanism sub-tree and importing common cause failure module sub-tree into component fault tree.

By the above method and system, component fault tree of n levels of events (wherein n is greater than or equal to 6) of six layers based on physics of failure is formed by constructing, respectively, fault information database and fault tree according to the category of the component, constructing fault tree of component of each category according to the six layers based on physics of failure and its logical relationship, and simplifying the fault tree by transferring common cause mechanism sub-tree and importing common cause failure module sub-tree. From the point of physical failure, the failure mode, failure mechanism and influencing factor of components of the same category have a great in common due to the similarity of their design structure and process parameters. Based on the similarity in failure modes and failure mechanisms of components of the same category, fault tree of each category is constructed in accordance with the logic relationship of physics of failure, such that the failure mechanism and failure paths corresponding to the failure mode may be determined and effective control measure can be proposed. Thus, the fault tree constructed herein can deep into the layer based on physics of failure of a component to conduct analysis, and accurately describe the failure paths, failure mechanism, mechanism factor and influencing factor of various failure modes in the form of a node event, which can meet the requirements of component fault tree analysis and mechanism reason analysis.

DETAILED DESCRIPTION OF THE PREFERRED EMBODIMENTS

Figure 1:
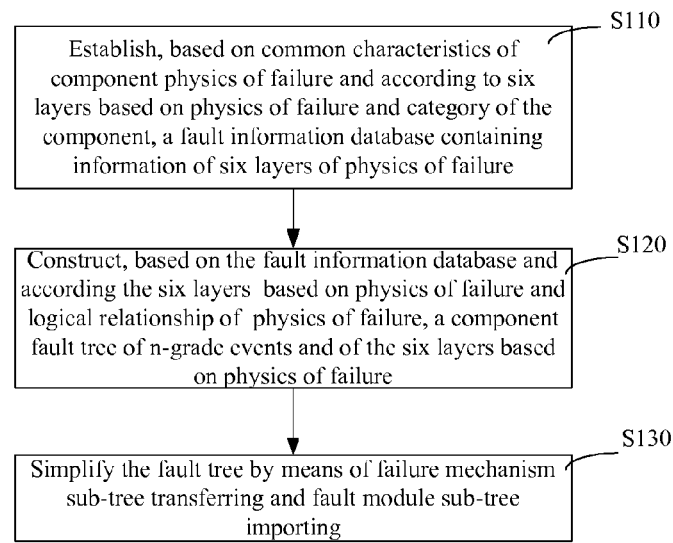
FIG. 1 is a flowchart showing a method for constructing component fault tree based on the physics of failure according to an embodiment of the disclosure.
Figure 2:
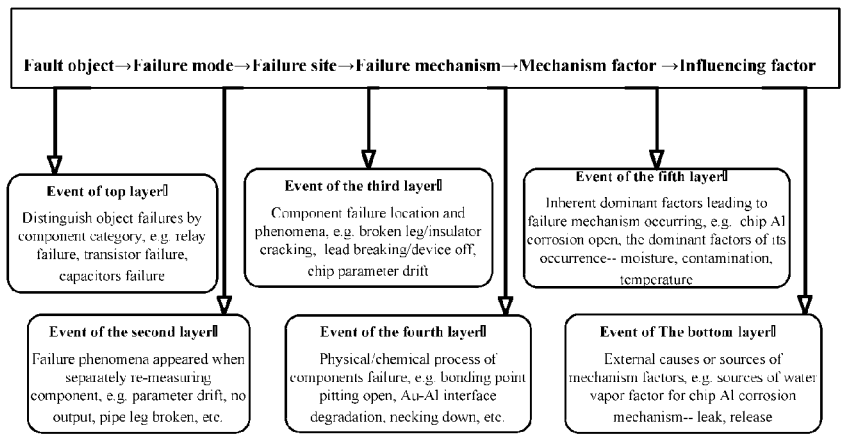
FIG. 2 is a schematic diagram showing six layers based on physics of failure of a component according to an embodiment of the disclosure.

As shown in FIG. 1, a method for constructing component fault tree based on physics of failure includes the following steps.

Step S110: constructing, based on common characteristics of component and according to six layers based on physics of failure and category of a component, component fault information database containing information of six layers based on physics of failure.

Information of the first layer, "fault object": taking a certain category of components as the object information. Information set of "fault object" of all categories of components is $Q=\{Q_1, Q_2, \ldots, Q_i, \ldots, Q_z\}$, wherein $Q_i$ is the fault object information of components of $i^{th}$ type, and $i=1, 2, \ldots, z$, wherein z is the total number of categories of components.

Information of the second layer, "failure mode": taking the electrical parameters and the result of appearance failure of the component as the information. Information set of "failure mode" $Q_2=\{Q_{2,1}, Q_{2,2}, \ldots, Q_{2,j}, \ldots, Q_{2,m}\}$, wherein $Q_{2,j}$ is the information of $j^{th}$ failure mode of a component, and $j=1, 2, \ldots, m$, wherein m is the total number of failure modes.

Information of the third layer, "failure site": taking the specific failure site of the component failure mode as the information. Information set of "failure site" is $Q_{3,j}=\{Q_{3,j,1}, Q_{3,j,2}, \ldots, Q_{3,j,k}, \ldots, Q_{3,j,p}\}$, wherein $Q_{3,j,k}$ is the information of $k^{th}$ failure site of $j^{th}$ failure mode of a component, and $k=1, 2, \ldots, p$, wherein p is the total number of failure sites. After determining the failure unit, the functional circuit device gives the failure site according to functional logic analysis.

Information of the fourth layer, "failure mechanism": taking the failure mechanism of the failure site as the information. Information set of "failure mechanism" is $Q_{4,j}=\{Q_{4,j,1}, Q_{4,j,2}, \ldots, Q_{4,j,q}, \ldots, Q_{4,j,r}\}$, wherein $Q_{4,j,q}$ is the information of $q^{th}$ failure mechanism of $j^{th}$ failure mode of a component, and $q=1, 2, \ldots, r$, wherein r is the total number of failure mechanisms.

Information of the fifth layer, "mechanism factor": taking the intrinsic factor leading to failure mechanism as the information. Information set of "mechanism factor" is $Q_{5,j}=\{Q_{5,j,1}, Q_{5,j,2}, \ldots, Q_{5,j,s}, \ldots, M_{5,j,t}\}$, wherein $Q_{5,j,s}$ is the information of $s^{th}$ mechanism factor of $j^{th}$ failure mode of a component, and $s=1, 2, \ldots, t$, wherein t is the total number of mechanism factors.

Information of the sixth layer, "influencing factor": taking the external cause leading to mechanism factor as the information. Information set of "influencing factor" is $Q_{6,j}=\{Q_{6,j,1}, Q_{6,j,2}, \ldots, Q_{6,j,u}, \ldots, Q_{6,j,v}\}$, wherein $Q_{6,j,u}$ is the information of $u^{th}$ "influencing factor of $j^{th}$ failure mode of a component, and $u=1, 2, \ldots, v$, wherein v is the total number of influencing factors.

Step S120: constructing, based on the failure information database and according to the six layers based on physics of failure and logical relationship of physics of failure, component fault tree, and forming component fault tree of n levels of events of six layers based on physics of failure; that is, there are n levels of events in the component fault tree, wherein n is greater than or equal to 6.

Event of the top layer, "fault object": event set of "fault object" of all categories of components is $T=\{T_1, T_2, \ldots, T_i, \ldots, T_z\}$, wherein $T_i$ is the fault event of components of $i^{th}$ type, and $i=1, 2, \ldots, z$, wherein z is the total number of categories of components.

Event of the second layer, "failure mode": taking the electrical parameters and the result of appearance failure of the component as the intermediate event. Event set of "failure mode" is $M_2=\{M_{2,1}, M_{2,2}, \ldots, M_{2,j}, \ldots, M_{2,m}\}$, wherein $M_{2,j}$ is the event of $j^{th}$ failure mode of a component, and $j=1, 2, \ldots, m$, wherein m is the total number of failure modes.

Event of the third layer, "failure site": taking the specific failure site of the failure mode as the intermediate event. Event set of "failure site" is $M_{3,j}=\{M_{3,j,1}, M_{3,j,2}, \ldots, M_{3,j,k}, \ldots, M_{3,j,p}\}$, wherein $M_{3,j,k}$ is the event of $k^{th}$ failure site of $j^{th}$ failure mode of a component, and k=1, 2, ..., p, wherein p is the total number of failure sites. After determining the failure unit, the functional circuit device gives the failure site according to functional logic analysis.

Event of the fourth layer, "failure mechanism": taking the failure mechanism of the failure site as the intermediate event. Event set of "failure mechanism" is $M_{4,j}=\{M_{4,j,1}, M_{4,j,2}, \ldots, M_{4,j,q}, \ldots, M_{4,j,r}\}$, wherein $M_{4,j,q}$ is the event of $q^{th}$ failure mechanism of $j^{th}$ failure mode of a component, and q=1, 2, ..., r, wherein r is the total number of failure mechanisms.

Event of the fifth layer, "mechanism factor": taking the intrinsic factor leading to failure mechanism as the intermediate event. Event set of "mechanism factor" is $M_{5,j}=\{M_{5,j,1}, M_{5,j,2}, \ldots, M_{5,j,s}, \ldots, M_{5,j,t}\}$, wherein $M_{5,j,s}$ is the event of $s^{th}$ mechanism factor of $j^{th}$ failure mode of a component, and s=1, 2, ..., t, wherein t is the total number of mechanism factors. Mechanism factors are extracted according to the model of mechanism based on physics of failure and model of degradation life. For example, as to the failure mechanism of aluminum electro-migration of chip, factors leading to aluminum electro-migration determined by the Black equation, $$TF = A_0 \cdot (J - J_{crit})^{-n} \cdot \exp\left(\frac{E_a}{kT}\right),$$

are current density J, temperature T, and time TF.

Event of the bottom layer, "influencing factor": taking the external cause leading to mechanism factor as the bottom event. Event set of "influencing factor" is $X_{6,j}=\{X_{6,j,1}, X_{6,j,2}, \ldots, X_{6,j,u}, \ldots, X_{6,j,v}\}$, wherein $X_{6,j,u}$ is the event of $u^{th}$ "influencing factor of $j^{th}$ failure mode of a component, and u=1, 2, ..., v, wherein v is the total number of influencing factors.

Logic gate of event: logic gates of events between layers are associated by the logic causality relationship of physics of failure. An OR gate is used between events of fault object, failure mode, failure site, failure mechanism. The OR gate structure function satisfies $$\Phi(\vec{X}) = \bigcup_{1}^{n} x_i,$$

wherein $\Phi$ is upper-level event status, and x is lower-level event status. When $x_i$ is 0 or 1, $$\Phi(\vec{X}) = 1 - \prod_{1}^{n}(1 - x_i),$$

representing that a higher event will occur as long as a lower-level event occurs. AN "AND gate" or an "OR gate" is used between events of failure mechanism, mechanism factor and influencing factor. The AND gate structure function satisfies $$\Phi(\vec{X}) = \bigcap_{1}^{n} x_i;$$

When $x_i$ is 0 or 1, $$\Phi(\vec{X}) = \prod_{1}^{n} x_i,$$

representing that a higher event will occur only when all lower-level events occur.

According to needs, events of each layer of the fault tree can be decomposed into related events of 1 to 3 levels, forming a component fault tree of n levels of events of the six layers based on physics of failure, wherein n is greater than or equal to 6.

Step S130: simplifying the fault tree by means of failure mechanism sub-tree transferring and fault module sub-tree importing.

Establishing mechanism sub-tree set: establishing, based on fault tree of various components, a sub-tree set of common cause failure mechanism {A,B,C,D}, in which sub-tree set of degenerative failure mechanism is $A=\{A_1, A_2, \ldots, A_s, \ldots, A_g\}$, wherein $A_s$ represents the $s^{th}$ sub-tree of degenerative failure mechanism, s=1, 2, ..., g, and g is the total number of sub-tree of degenerative failure mechanism; sub-tree set of transient failure mechanism is $B=\{B_1, B_2, \ldots, B_e, \ldots, B_f\}$, wherein $B_e$ represents the $e^{th}$ sub-tree of transient failure mechanism, e=1, 2, ..., f, and f is the total number of sub-tree of transient failure mechanism; sub-tree set of defective failure mechanism is $C=\{C_1, C_2, \ldots, C_x, \ldots, C_h\}$, wherein $C_x$ represents the $x^{th}$ sub-tree of defective failure mechanism, x=1, 2, ..., h, and h is the total number of sub-tree of defective failure mechanism; sub-tree set of improper use failure mechanism is $D=\{D_1, D_2, \ldots, D_Y, \ldots, D_o\}$, wherein $D_Y$ represents the $y^{th}$ sub-tree of improper use failure mechanism, Y=1, 2, ..., o, and o is the total number of sub-tree of improper use failure mechanism.

Establishing fault module sub-tree set: establishing, based on fault tree of various components, sub-tree set of common cause failure module {E,F}, in which sub-tree set of universal component failure module is $E=\{E_1, E_2, \ldots, E_G, \ldots, E_H\}$, wherein $E_G$ represents the $G^{th}$ sub-tree of failure module, G=1, 2, ..., H, and H is the total number of failure module sub-tree; sub-tree set of typical component failure module is $F=\{F_1, F_2, \ldots, F_L, \ldots, F_M\}$, wherein $F_L$ represents the $L^{th}$ sub-tree of typical component failure module, L=1, 2, ..., M, and M is the total number of failure module sub-tree.

Simplifying the fault tree: simplifying the fault tree by means of failure mechanism sub-tree transferring and fault module sub-tree importing.

By the above method and system, component fault tree of n levels of events (wherein n is greater than or equal to 6) of the six layers based on physics of failure is formed by constructing, respectively, fault information database and fault tree according to the category of the component, constructing fault tree of component of each category according to the six layers based on physics of failure and its logical relationship, and simplifying the fault tree by means of common cause failure mechanism sub-tree transferring and common cause fault module sub-tree importing. From the point of physical failure, the failure mode, failure mechanism and influencing factor of components of the same category have a great in common due to the similarity of their design structure and process parameters. Based on the similarity in failure modes and failure mechanisms of components of the same category, fault tree of each category is constructed in accordance with the logic relationship of physics of failure, such that the failure mechanism and failure paths corresponding to the failure mode may be determined and effective control measure can be proposed. Thus, the fault tree constructed herein can deep into the layer based on physics of failure of a component to conduct analysis, and accurately describe the failure paths, failure mechanism, mechanism factor and influencing factor of various failure modes in the form of a node event, which can meet the requirements of component fault tree analysis and mechanism reason analysis.

An example of construction of fault tree of hybrid integrated circuit will be further described to illustrate the specific implementation steps of the disclosure and the beneficial effect brought.

The three steps of the present implementation is as follows.

Step 1, establishing fault information database of hybrid integrated circuit.

Classifying and organizing failure cases and failure information of hybrid integrated circuit, and establishing, according to six layers based on physics of failure, information database:

information of "fault object" $Q_1$=Failure of hybrid integrated circuit malfunction;

information set of "failure mode" $Q_2=\{Q_{2,1}, Q_{2,2}, Q_{2,3}, Q_{2,4}, Q_{2,5}\}$={electrical parameter drift, no output, open circuit, short circuit, hermetic leak};

information set of "failure site" $Q_{3,j}=\{Q_{3,1,1}, \ldots, Q_{3,2,1}, \ldots, Q_{3,3,1}, \ldots, Q_{3,4,1}, \ldots\}$={device parameter drift, component parameter drift, sticky/welding degradation, . . . };

information set of "failure mechanism" $Q_{4,j}=\{Q_{4,1,1}, \ldots, Q_{4,2,1}, \ldots, Q_{4,3,1}, \ldots, Q_{4,4,1}, \ldots, Q_{4,5,1}, \ldots\}$={device degradation, solder fatigue, aging organic glue, . . . };

information set of "mechanism factor" $Q_{5,j}=\{Q_{5,1,1}, \ldots, Q_{5,2,1}, \ldots, Q_{5,3,1}, \ldots, Q_{5,4,1}, \ldots, Q_{5,5,1}, \ldots\}$={static stress, interfacial thermal mismatch stress, axial tension, . . . };

information set of "influencing factor" $Q_{6,j}=\{Q_{6,1,1}, \ldots, Q_{6,2,1}, \ldots, Q_{6,3,1}, \ldots, Q_{6,4,1}, \ldots, Q_{6,5,1}, \ldots\}$={machine punching, resonance, thermal shock, impact, ambient temperature, . . . }.

Step 2, constructing fault tree of hybrid integrated circuit.

Based on the fault information data base established in Step 1, construct fault tree of nine-level events according to the six layers based on physics of failure, including:

event of "fault object" $T_1$=hybrid integrated circuit failure;

event set of "failure mode" $M_2=\{M_{2,1}, M_{2,2}, M_{2,3}, M_{2,4}, M_{2,5}\}$={parameter drift, no output, open circuit, short circuit, hermetic leak}, with "OR" gate association between $M_2$ and $T_1$;

event set of "failure site" $M_{3,j}=\{M_{3,1,1}, \ldots, M_{3,2,1}, \ldots, M_{3,3,1}, \ldots, M_{3,4,1}, \ldots\}$={device and component parameter drift, sticky/welding degradation, aging conductive adhesive, bonding interface degradation, . . . }, with "OR" gate association between $M_{3,j}$ and $M_2$;

event set of "failure mechanism" $M_{4,j}=\{M_{4,1,1}, \ldots, M_{4,2,1}, \ldots, M_{4,3,1}, \ldots, M_{4,4,1}, \ldots, M_{4,5,1}, \ldots\}$={device and component parameter drift, solder fatigue, aging organic glue, Al corrosion open, . . . }, with "OR" gate association between $M_{4,j}$ and $M_{3,j}$;

event set of "mechanism factor" $M_{5,j}=\{M_{5,1,1}, \ldots, M_{5,2,1}, \ldots, M_{5,3,1}, \ldots, M_{5,4,1}, \ldots, M_{5,5,1}, \ldots\}$={static stress, interfacial thermal mismatch stress, axial tension, cyclic shear stress, . . . }, with "AND" and "OR" gate association between $M_{5,j}$ and $M_{4,j}$;

event set of "influencing factor" $X_{6,j}=\{X_{6,1,1}, \ldots, X_{6,2,1}, \ldots, X_{6,3,1}, \ldots, X_{6,4,1}, \ldots, X_{6,5,1}, \ldots\}$={machine punching, resonance, thermal shock, impact, ambient temperature, . . . }, with "OR" and "AND" gate association between $X_{6,j}$ and $M_{5,j}$.

Step 3, simplifying the fault tree by means of common cause failure mechanism sub-tree transferring and common cause fault module sub-tree importing.

A common cause failure mechanism sub-tree set including 17 sub-trees is established:

$A=\{A_1, A_2, \ldots, A_8\}$={Au—Al bonding degradation, chip Al corrosion, . . . };

$B=\{B_1, B_2, \ldots, B_6\}$={cap stress cracking, substrate stress cracking, . . . };

$C=\{C_1, C_2\}$={wire corrosion cracking, short circuit of bonding wire and chip};

$D=\{D_1\}$={outer pin breaking}.

A common cause failure module sub-tree set is established:

$E=\{E_1, E_2, \ldots, E_6\}$={transistor failure, diode failure, . . . , chip capacitor failure};

$F=\{F_1, F_2, F_3\}$={airtight package failure, component welding/stick open, bonding wire open circuit}.

Fault tree simplification: simplifying the fault tree by transferring common cause mechanism sub-tree and importing common cause failure module sub-tree into the fault tree.

Thus, a fault tree of nine-level events and six layers based on physics of failure is created.

The example further illustrates the beneficial effects of the method of the disclosure.

The fault tree of hybrid integrated circuit established by means of the method of the present disclosure has the advantages of clear concept of physics of failure, and clear relationship between failure events of upper and lower levels. Events of six layers include: fault object, failure mode, failure site, failure mechanism, mechanism factor, and influencing factor, which includes abundant information of physics of failure. Therefore, it is possible to fully reflect the logical relationship between physical events, to conduct deeper analysis of the cause of component failure, to accurately describe, in the form of events, the failure path, failure mechanism, mechanism factor and influencing factor, so as to meet needs of fault tree analysis and mechanism cause analysis.

Meanwhile, the example also demonstrates that the method of the disclosure can well solve the difficulty in establishing the component fault tree, and achieve good convergence of the top events of the fault tree of hybrid integrated circuit and the bottom events of the fault tree of whole system. Combined with circuit function analysis, the method is capable of conducting FTA analysis to events at all levels of the fault tree, with characteristics of accurate failure positioning and clear mechanism analysis. In addition, the method is applicable to construction of fault tree of various electronic components.

In one embodiment, the constructing of fault information database further includes:

determining, based on the common physical characteristics of component physics of failure, six information layers based on physics of failure, namely: information layer of fault mode, information layer of failure mode, information layer of failure site, information layer of failure mechanism, information layer of mechanism factor, and information layer of influencing factor;

classifying and organizing failure cases and failure information, and establishing, according to six layers based on physics of failure, fault information database of the six layers based on physics of failure.

Information of the first layer, "fault object": taking a certain category of components as information $Q_i$;

Information set of "fault object" of all categories of components is $Q=\{Q_1, Q_2, \ldots, Q_i, \ldots, Q_z\}$.

Information of the second layer, "failure mode": taking the electrical parameters and the result of appearance failure of the component as the information. Information set of "failure mode" $Q_2=\{Q_{2,1}, Q_{2,2}, \ldots, Q_{2,j}, \ldots, Q_{2,m}\}$.

Information of the third layer, "failure site": taking the specific failure site of the component failure mode as the information. Information set of "failure site" is $Q_{3,j}=\{Q_{3,j,1}, Q_{3,j,2}, \ldots, Q_{3,j,k}, \ldots, Q_{3,j,p}\}$.

Information of the fourth layer, "failure mechanism": taking the failure mechanism of the failure site as the information. Information set of "failure mechanism" is $Q_{4,j}=\{Q_{4,j,1}, Q_{4,j,2}, \ldots, Q_{4,j,q}, \ldots, Q_{4,j,r}\}$.

Information of the fifth layer, "mechanism factor": taking the intrinsic factor leading to failure mechanism as the information. Information set of "mechanism factor" is $Q_{5,j}=\{Q_{5,j,1}, Q_{5,j,2}, \ldots, Q_{5,j,s}, \ldots, M_{5,j,t}\}$.

Information of the sixth layer, "influencing factor": taking the external cause leading to mechanism factor as the information. Information set of "influencing factor" is $Q_{6,j}=\{Q_{6,j,1}, Q_{6,j,2}, \ldots, Q_{6,j,u}, \ldots, Q_{6,j,v}\}$.

In one embodiment, the step of constructing component fault tree further includes:

determining, based on fault information, six layers of events of the fault tree, namely: fault mode, failure mode, failure site, failure mechanism, mechanism factor, and influencing factor;

determining, according to the causality of the process of physics of failure, logic gates between events in the component fault tree, and constructing component fault tree of n levels of events of the six layers based on physics of failure.

Event of the first layer is defined as "fault object", and the top event of a certain category of components is $T_i$;

event set of "fault object" of all categories of components is $T=\{T_1, T_2, \ldots, T_i, \ldots, T_Z\}$.

Event of the second layer is defined as "failure mode", which takes the electrical parameters and the result of appearance failure of the component as the second intermediate event. Event set of "failure mode" is $M_2=\{M_{2,1}, M_{2,2}, \ldots, M_{2,j}, \ldots, M_{2,m}\}$.

Event of the third layer is defined as "failure site", which takes the specific failure site of the failure mode as the third intermediate event. Event set of "failure site" is $M_{3,j}=\{M_{3,j,1}, M_{3,j,2}, \ldots, M_{3,j,k}, \ldots, M_{3,j,p}\}$.

Event of the fourth layer is defined as "failure mechanism", which takes the failure mechanism of the failure site as the fourth intermediate event. Event set of "failure mechanism" is $M_{4,j}=\{M_{4,j,1}, M_{4,j,2}, \ldots, M_{4,j,q}, \ldots, M_{4,j,r}\}$.

Event of the fifth layer is defined as "mechanism factor", which takes the intrinsic factor leading to failure mechanism as the fifth intermediate event. Event set of "mechanism factor" is $M_{5,j}\{M_{5,j,1}, M_{5,j,2}, \ldots, M_{5,j,s}, \ldots, M_{5,j,t}\}$. Mechanism factors are extracted according to the model of mechanism based on physics of failure and model of degradation life.

Event of the six layer, i.e., the bottom layer, is defined as "influencing factor", which takes the external cause leading to failure mechanism factor as the bottom event. Event set of "influencing factor" is $X_{6,j}=\{X_{6,j,1}, X_{6,j,2}, \ldots, X_{6,j,u}, \ldots, X_{6,j,v}\}$.

According to the causality of the process of physics of failure, the logic gates between events in the component fault tree are determined and component fault tree of n levels of events of six layers based on physics of failure is constructed, wherein n is greater than or equal to 6.

In one embodiment, the step of simplifying the fault tree further includes:

establishing component common cause failure mechanism sub-tree set and common cause failure module sub-tree set; establishing mechanism sub-tree set: establishing, based on fault tree of various components, a sub-tree set of common cause failure mechanism $\{A,B,C,D\}$, in which sub-tree set of degenerative failure mechanism is $A=\{A_1, A_2, \ldots, A_s, \ldots, A_g\}$, wherein $A_s$ represents the $s^{th}$ sub-tree of degenerative failure mechanism, $s=1, 2, \ldots, g$, and g is the total number of sub-tree of degenerative failure mechanism; sub-tree set of transient failure mechanism is $B=\{B_1, B_2, \ldots, B_e, \ldots, B_f\}$, wherein $B_e$ represents the $e^{th}$ sub-tree of transient failure mechanism, $e=1, 2, \ldots, f$, and f is the total number of sub-tree of transient failure mechanism; sub-tree set of defective failure mechanism is $C=\{C_1, C_2, \ldots, C_x, \ldots, C_h\}$, wherein $C_x$ represents the $x^{th}$ sub-tree of defective failure mechanism, $x=1, 2, \ldots, h$, and h is the total number of sub-tree of defective failure mechanism; sub-tree set of improper use failure mechanism is $D=\{D_1, D_2, \ldots, D_Y, \ldots, D_o\}$, wherein $D_Y$ represents the $y^{th}$ sub-tree of improper use failure mechanism, $Y=1, 2, \ldots, o$, and o is the total number of sub-tree of improper use failure mechanism.

Establishing fault module sub-tree set: establishing, based on fault tree of various components, sub-tree set of common cause failure module $\{E,F\}$, in which sub-tree set of universal component failure module is $E=\{E_1, E_2, \ldots, E_G, \ldots, E_H\}$, wherein $E_G$ represents the $G^{th}$ sub-tree of failure module, $G=1, 2, \ldots, H$, and H is the total number of failure module sub-tree; sub-tree set of typical component failure module is $F=\{F_1, F_2, \ldots, F_L, \ldots, F_M\}$, wherein $F_L$ represents the $L^{th}$ sub-tree of typical component failure module, $L=1, 2, \ldots, M$, and M is the total number of failure module sub-tree.

By way common cause mechanism sub-tree transfer and common cause failure module sub-tree importing into component fault tree, simplify the fault tree. Simplification of the fault tree: simplifying the fault tree by means of failure mechanism sub-tree transferring and fault module sub-tree importing.

Figure 3:
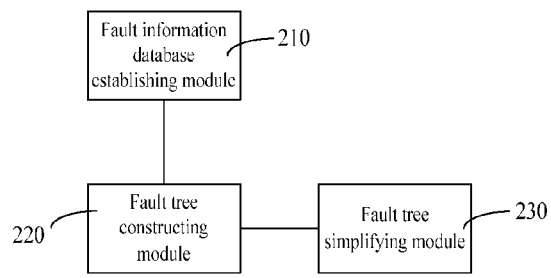
FIG. 3 is a structural schematic diagram showing a system for constructing component fault tree based on physics of failure according to an embodiment of the disclosure.

As shown in FIG. 3, a system for constructing component fault tree based on physics of failure includes a fault information database establishing module, a fault tree constructing module, and a fault tree simplifying module.

The fault information database establishing module is configured to establish, based on common characteristics of component physics of failure and according to six layers based on physics of failure and category of the component, a component fault information database containing information of six layers based on physics of failure.

The fault tree constructing module is configured to construct, based on the fault information database and according to the six layers based on physics of failure and logical relationship of physics of failure, a component fault tree of n levels of events of six layers based on physics of failure.

The fault tree simplifying module is configured to simplify the fault tree by means of common cause failure mechanism sub-tree transferring and common cause fault module sub-tree importing.

In one embodiment, the fault information database establishing module is further configured to determine, based on the common physical characteristics of component physics of failure, six information layers based on physics of failure, namely: information layer of fault mode, information layer of failure mode, information layer of failure site, information layer of failure mechanism, information layer of mechanism factor, and information layer of influencing factor; and to classify and organize failure cases and failure information to establish, according to six layers based on physics of failure, fault information database of the six layers based on physics of failure.

In one embodiment, the fault tree constructing module is further configured to determine, based on the fault information database, six layers of events of the fault tree, namely: fault mode, failure mode, failure site, failure mechanism, mechanism factor, and influencing factor; and to determine, according to the causality of the process of physics of failure, logic gates between events in the component fault tree, and to construct component fault tree of n levels of events of six layers based on physics of failure.

In one embodiment, the fault tree simplifying module is further configured to establish component common cause failure mechanism sub-tree set and common cause failure module sub-tree set; the sub-tree set of component common cause failure mechanism and the sub-tree set of common cause failure module represent, respectively, a sub-tree set of failure mechanism under the influence of same event and a sub-tree set of failure module under the influence of same event; and to simplify the fault tree by means of common cause mechanism sub-tree transfer and common cause failure module sub-tree importing into component fault tree.

Other technical characteristics of the system are the same as that of method of the present disclosure, which will not go into details.

The embodiments are chosen and described in order to explain the principles of the disclosure and their practical application so as to allow others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A method for constructing component fault tree based on physics of failure, comprising:
    establishing, based on common characteristics of component physics of failure and according to six layers based on physics of failure and category of the component, a fault information database containing information of the six layers based on physics of failure; constructing, based on the fault information database and according to the six layers based on physics of failure and logical relationship of physics of failure, a component fault tree of n levels of events of six layers based on physics of failure, wherein n is greater than or equal to 6; and
    simplifying the fault tree by means of failure mechanism sub-tree transferring and fault module sub-tree importing,
    wherein the step of establishing a fault information database further comprises:
    determining, based on the common physical characteristics of component physics of failure, six information layers based on physics of failure, namely: information layer of fault mode, information layer of failure mode, information layer of failure site, information layer of failure mechanism, information layer of mechanism factor, and information layer of influencing factor; and
    classifying and organizing failure cases and failure information, and establishing, according to the six layers based on physics of failure, fault information database of the six layers based on physics of failure.

2. The method of claim 1, wherein the step of constructing component fault tree further comprises:
    determining, based on the fault information database, six layers of events of the fault tree, namely: fault mode, failure mode, failure site, failure mechanism, mechanism factor, and influencing factor; and
    determining, according to the six layers based on physics of failure and logical relationship of physics of failure, logic gates between events of component fault tree, and constructing a component fault tree of n levels of events of six layers based on physics of failure.

3. The method of claim 1, wherein the step of simplifying the fault tree further comprises:
    establishing component common cause failure mechanism sub-tree set and common cause failure module sub-tree set; the sub-tree set of component common cause failure mechanism and the sub-tree set of common cause failure module represent, respectively, a sub-tree set of failure mechanism under the influence of same event and a sub-tree set of failure module under the influence of same event; and
    simplifying the component fault tree by transferring common cause mechanism sub-tree and importing common cause failure module sub-tree into the component fault tree.

4. A system for constructing component fault tree based on physics of failure, comprising:
    a fault information database establishing module, configured to establish, based on common characteristics of component physics of failure and according to six layers based on physics of failure and category of the component, a component fault information database containing information of six layers based on physics of failure;
    a fault tree constructing module, configured to construct, based on the fault information database and according to the six layers based on physics of failure and logical relationship of physics of failure, a component fault tree of n levels of events of six layers based on physics of failure; and
    a fault tree simplifying module, configured to simplify the fault tree by means of common cause failure mechanism sub-tree transferring and common cause fault module sub-tree importing
    wherein the fault information database establishing module is further configured to determine, based on the common physical characteristics of component physics of failure, six information layers based on physics of failure, namely: information layer of fault mode, information layer of failure mode, information layer of failure site, information layer of failure mechanism, information layer of mechanism factor, and information layer of influencing factor; and
    to classify and organize failure cases and failure information to establish, according to six layers based on physics of failure, fault information database of the six layers based on physics of failure.

5. The system of claim 4, wherein the fault tree constructing module is further configured to determine, based on the fault information database, six layers of events of the fault tree, namely: fault mode, failure mode, failure site, failure mechanism, mechanism factor, and influencing factor; and to determine, according to the six layers based on physics of failure and logical relationship of physics of failure, logic gates between events in the component fault tree, and to construct component fault tree of n levels of events of six layers based on physics of failure.

6. The system of claim 4, wherein the fault tree simplifying module is further configured to establish component common cause failure mechanism sub-tree set and common cause failure module sub-tree set; the sub-tree set of component common cause failure mechanism and the sub-tree set of common cause failure module represent, respectively, a sub-tree set of failure mechanism under the influence of same event and a sub-tree set of failure module under the influence of same event; and to simplify the component fault tree by transferring common cause mechanism sub-tree and importing common cause failure module sub-tree into the component fault tree.

* * * * *